United States Patent [19]

Scardera et al.

[11] 4,070,298

[45] * Jan. 24, 1978

[54] DEFOAMING DETERGENT ADDITIVE

[75] Inventors: Michael Scardera, Hamden; Robert N. Scott, Wallingford, both of Conn.

[73] Assignee: Olin Corporation, New Haven, Conn.

[ * ] Notice: The portion of the term of this patent subsequent to May 11, 1993, has been disclaimed.

[21] Appl. No.: 708,468

[22] Filed: July 26, 1976

[51] Int. Cl.$^2$ .......................... C11D 1/78; C11D 1/72; C11D 3/075

[52] U.S. Cl. .................. 252/89 R; 252/99; 252/135; 252/321; 252/351; 252/DIG. 1; 252/DIG. 17

[58] Field of Search ............... 252/DIG. 1, DIG. 17, 252/89, 99, 135, 321, 351

[56] References Cited

U.S. PATENT DOCUMENTS

| | | | |
|---|---|---|---|
| 3,314,891 | 4/1967 | Schmolka et al. | 252/89 |
| 3,334,147 | 8/1967 | Brunelle et al. | 260/611 |
| 3,340,309 | 9/1967 | Weipert | 260/615 |
| 3,382,176 | 5/1968 | Jakobi et al. | 252/89 |
| 3,523,902 | 8/1970 | Schmolka | 252/527 |
| 3,549,539 | 12/1970 | Mallows | 252/99 |
| 3,595,968 | 7/1971 | Groves | 252/99 |
| 3,630,923 | 12/1971 | Simmons et al. | 252/99 |
| 3,635,827 | 1/1972 | Jakobi | 252/89 |
| 3,741,912 | 6/1973 | Kaneko | 252/529 |
| 3,869,412 | 3/1975 | Wääg | 252/7 |
| 3,956,401 | 5/1976 | Scardera et al. | 260/615 B |

FOREIGN PATENT DOCUMENTS 7,007,973  3/1970  Japan.

*Primary Examiner*—P.E. Willis, Jr.
*Attorney, Agent, or Firm*—William A. Simons; Thomas P. O'Day; F. A. Iskander

[57] ABSTRACT

An additive composition which can be adapted into conventional automatic dishwasher detergents for reducing foam during use thereof, comprising:

A. a nonionic surface active agent having the formula:

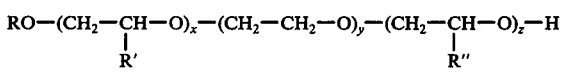

wherein
 R is a substantially linear, alkyl radical having an average from about 6 to about 12 carbon atoms,
 R' is a linear, alkyl radical of 1 to about 4 carbon atoms,
 R" is a linear, alkyl radical of 1 to about 4 carbon atoms,
 $x$ is an integer of 1 to about 6,
 $y$ is an integer of about 4 to about 20, and
 $z$ is an integer of about 4 to about 25, and B. an alkyl phosphate ester having an average of 16 to 28 carbon atoms in the alkyl radical; and
 wherein the weight ratio of (A):(B) is from about 1:1 to about 99:1.

16 Claims, No Drawings

DEFOAMING DETERGENT ADDITIVE

BACKGROUND OF THE INVENTION

1. Field of the Invention

This invention relates to detergent formulations. In particular, this invention relates to defoaming detergent compositions especially suitable for use in automatic dishwashing machines. And specifically, this invention relates to a defoaming phosphate ester - low-foaming, nonionic surfactant combination particularly useful in automatic dishwashing detergents.

2. Brief Description of the Prior Art

The generation of foam in automatic dishwashing machines has been a problem facing consumers and industry for many years. Development of excessive foam in the dishwashing machines can result in machine overflow and reduced rotor speeds of the perforated spray arms in the dishwasher. Even moderate foaming reduces the efficiency of the automatic dishwashing machine by retarding the mechanical action of the water spray and by reducing the rate of rotation of the spray arm.

The terms "foam" and "foaming" as used herein refer to the combination of entrapped air and surface active material at the surface of an aqueous solution. Such surface active material can come from the soil on the dishes or from surfactants contained in the dishwashing detergent. A particularly troublesome source of foam is proteinaceous soil, especially raw egg soil.

Many of the present automatic dishwashing detergent manufacturers have tried to overcome this foaming problem by adding low-foaming surfactants and foam-suppressants or defoamers to their detergent formulations. U.S. Pat. Nos. 3,314,891 and 3,595,968 show attempts to solve this problem with types of additives different than the present invention to dishwasher detergents. The former patent describes several low-foaming, nonionic surfactants combined with a stearyl or oleyl acid phosphate defoamer. The second patent describes another dishwasher detergent additive which also contains a low-foaming, nonionic surfactant in conjunction with a phosphate ester defoamer. The compositions disclosed in both of these patents are said to be effective for reducing the foam caused by the presence of proteinaceous soil.

Another U.S. Pat. No. 3,741,912 is similar to the above two patents. It discloses the addition of an oxyethylated amine to the nonionic surfactant-phosphate ester additive in order to prevent the two compounds from separating during storage which causes problems in subsequent handling and formulating.

However, a need still exists in this particular art for a combination of nonionic surfactants and alkyl phosphate esters which can be employed as an effective dishwashing detergent additive that has low-foaming and defoaming properties, will not separate from each other during storage, can be formulated with several combinations of inorganic detergent salts (referred to sometimes as detergent "builders") and does not need an oxyethylated amine or other chemicals to prevent separation.

SUMMARY OF THE INVENTION

The present invention is directed to an improved defoamer additive composition, which is particularly suited for use in dishwasher detergents. Further, this composition advantageously will not separate apart in storage. The composition is comprised of (a) a select class of nonionic surfactants and (b) alkyl phosphate esters having an average of about 16 to about 28 carbon atoms in the alkyl radical. Both components will be described in greater detail below.

This invention is also directed to detergent formulations, especially dishwasher detergents, which contain the above additive composition.

DETAILED DESCRIPTION

The nonionic surfactant compounds employed in the composition of the present invention have the normal characteristics and properties required of surface active agents. Additionally, they are low-foaming, biodegradable liquids at room temperature and non-gelling in water solutions. They are novel in nature and are fully described and claimed in U.S. Pat. No. 3,956,401, *LOW FOAMING, BIODEGRADABLE, NONIONIC SURFACTANTS*, granted to the same inventors as herein, Michael Scardera and Robert N. Scott on May 11, 1976. The entire disclosure of this patent is incorporated herein by reference.

In particular, the surfactant compositions of this invention have the formula:

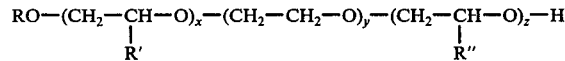

wherein

R is a substantially linear, alkyl radical having an average of from about 6 to about 12 carbon atoms, preferably from about 7 to about 10 carbon atoms, R' is a linear, alkyl radical of from 1 to about 4 carbon atoms, preferably from 1 to about 2 carbon atoms, and, is most desirably a methyl group, R" is a linear, alkyl radical of from 1 to about 4 carbon atoms, preferably from 1 to about 2 carbon atoms and most desirably a methyl group, x is an integer of 1 to about 6, and preferably about 2 to about 4, y is an integer of about 4 to about 20, and preferably about 5 to about 15, and z is an integer of about 4 to about 25, and preferably about 6 to about 20.

The R group, as noted above, is substantially or predominantly linear which means there is essentially no branching. This is important because the biodegradability of the product is detrimentally affected by branching. As described in detail in the above-noted U.S. Pat. No. 3,956,401, the R group is derived from a linear alcohol and generally from a mixture of linear alcohols. Due to the nature of the process by which these alcohols are prepared, there may be small amounts of branched-chains present. Generally, the presence of such small amounts of branched-chains will not adversely affect the overall properties of the final product. The terms "linear" or "substantially linear" radical when used in the specification and claims with respect to R are intended to include such small amounts of branching as defined above. The number of carbon atoms referred to for R is an average number since commercial grade alcohols are generally a mixture of more than one alcohol.

The values of x, y and z integers are actually average numbers based generally on the weight of alkylene oxide used per each mole of alcohol. Again, see the cited patent for explanation as to how exactly the nonionic surfactant of the present invention is produced.

The preferred mixture of alcohols to be used to make the instant nonionic surfactants is a well-known commercial mixture known as ALFOL 610 having an average of about 8.2 carbon atoms (about 22 weight percent of $C_6$, 39% of $C_8$ and 38% of $C_{10}$) and produced by Continental Oil Co. of Saddle Brook, New Jersey. Of course, other alcohol mixtures which make surfactants having the above-stated structure can be employed herein, too.

Specific preferred examples of surfactants used according to the present invention include those represented by the formulae

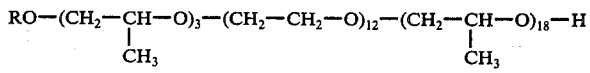

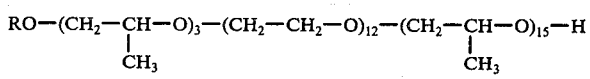

with R being a substantially linear, alkyl radical having an average of from about 7 to about 10 carbon atoms, These surfactants are generally made by the sequential, i.e., block, oxyalkylation of alcohols with (1) 3 moles of propylene oxide (PO), (2) 12 moles of ethylene oxide (EO), followed by either 18 or 15 moles of propylene oxide (PO) employing conventional techniques of making these types of adducts.

The second component of the additive composition of the invention is an alkyl phosphate ester in which the alkyl group contains an average of 16–28 carbon atoms. Any suitable ester or mixture thereof may be employed as taught or used according to the prior art. Generally, however, it is preferred to use those alkyl phosphate esters in which the alkyl group contains an average of 18–25, and still more preferably 19–23 carbon atoms.

The alkyl phosphate ester can be prepared, using conventional methods, by the reaction of a phosphorating agent with one or more alkyl alcohols having the above specified average content of carbon atoms in the alkyl chain. In effecting the reaction, it is preferable to employ such relative proportions of reactants as to provide a molar ratio of alcohols to phosphorating agent, ranging from about 1:1 to about 6:1. Usually, the phosphorating agent is phosphorous pentoxide or a polyphosphoric acid such as 115% polyphosphoric acid. A mixture of compounds usually results. These compounds, the exact structures of which are not known, may include monomeric, dimeric and polymeric adducts. Reactions of polyphosphoric acid or phosphorous pentoxide and long chain ($C_{10}$ ... $C_{28}$) alcohols to prepare phosphate esters is well established in the literature. The general methods of preparation of phosphate esters like those of the present invention can be found in *Organic Phosphorus Compounds*, Vol. 6, by Kosolapoff, G. M. and Maier, L., Wiley-Interscience, 1973, especially Chapter 15, and in *Organophosphorus Compounds* by Kosolapoff, G. M., John Wiley & Sons, Inc., 1950, in particular pages 222–277 and 343–345. Both of these references are incorporated into this application for this purpose.

Specific examples of alcohol mixtures that can be employed are ALFOL 20+ and 22+ alcohol mixtures produced by Continental Oil Co. ALFOL 20+ has a homolog distribution of approximately $C_{18}$ and lower (2 weight percent, $C_{20}$ (60%), $C_{22}$ (20%), $C_{24}$ (10%), $C_{26}$ (5%) and $C_{28}$ and higher (3%). ALFOL 22+ has a homolog distribution of approximately $C_{18}$ and lower (1%), $C_{20}$ (5%), $C_{22}$ (60%), $C_{24}$ (21%), $C_{26}$ (9%) and $C_{28}$ and higher (4%). Of the two mixtures, the first is preferred. Moreover, other alcohol mixtures having formulae within the claimed limits and other phosphorating agents which give the desired properties are included within the scope of the invention.

If desired, hydrogen peroxide or other suitable bleaching agents may be combined with the phosphate ester or with the total additive composition in order to bleach or lighten the color of the additive thereby making it more attractive; also water may be added to further improve the storage stability of the phosphate ester product and increase the amount of monomeric esters therein. The ester monomer appears to have better defoaming properties than the dimeric and polymeric structures.

The additive compositions of this invention generally contain a weight ratio of the nonionic surfactant to the phosphate ester from about 1:1 to about 99:1, preferably about 3:1 to about 90:1, and more preferably about 9:1 to about 49:1.

The blending of the ingredients in the aforementioned proportions can be readily done in conventional mixing apparatus at a temperature from about room temperature up to about 100° C, depending upon the melting point of the materials used, and when desirable, following the blending step by a grinding or flaking step so as to obtain the blended ingredients in a suitable size. The composition is then added to the automatic dishwasher detergent formulation in order to reduce foaming during use thereof. Also, the ingredients of the additive compositions of the invention can be added separately, in the proportions set forth, to the automatic dishwasher detergents to accomplish defoaming.

The automatic dishwasher detergents that can be combined with the present additive composition include a variety of commercially available detergent formulations. These may consist of inorganic salts, such as phosphates and silicates (referred to as detergent "builders"). They may or may not include a chlorinated compound such as potassium dichloroisocyanate or chlorinated trisodium phosphate and the percentages of the other builders may be varied. Thus, it is readily apparent that the additive composition of the invention can be employed in any dishwashing detergent formulation as disclosed or used in the prior art.

The amount of the additive composition in the total dishwashing detergent may be any amount which is effective to reduce foaming. Illustrative amounts range generally from about 0.2 to about 20 weight percent of the total automatic dishwashing detergent, preferably about 0.5 to about 10 weight percent and most preferably from about 1 to about 4 weight percent.

While the additive composition of the invention is especially suited for use with automatic dishwasher detergents, certainly it may be employed with other types of detergents where the problem of excessive foaming occurs.

The following examples are provided to illustrate the invention. In these examples, foam evaluation was carried out in a Hobart Kitched Aid dishwasher. The foam characteristics of the detergent compositions were measured by observing the rate of rotation of the perforated spray aim during the washing cycle in which raw egg soil and detergent were present in definitive quantities. The rate of rotation of the spray arm is, of course, inversely proportional to the amount of foam present. The procedure followed was to turn on the machine and fill with 11–12 liters of water. The dishwasher was opened, water temperature noted, and 15 g raw egg soil and 20 g formulated detergent was added to the water. The dishwasher was restarted and the rotation rate of the spray arm was measured by means of a magnetic counter. The first minute was considered mixing time and the rotation of the spray arm is noted after this mixing time for a total of 5 minutes at one minute intervals. The revolutions per minute (rpm) for the 4th minute were selected as the standard to be compared. Then the dishwasher was turned off and the water temperature noted at the end of the test. For a good comparison of tests, the water temperatures must be substantially the same for all tests. Excessive foam will stop the rotor (0 rpm) while a rotation of 70 rpm or higher is indicative of good foam suppression.

EXAMPLE 1

Part A

Preparation of Phosphate Ester Using 115% Polyphosphoric Acid (Ester Composition I)

A phosphate ester is prepared from ALFOL 20°, a mixture of $C_{20}$, $C_{22}$, $C_{24}$, $C_{26}$ and higher alcohols, where the $C_{26}$ and higher alcohols are less than 10 weight percent of the mixture, and 115% polyphosphoric acid as follows:

A 3-neck, 1-liter flask equipped with stirrer, thermometer and nitrogen blanket, is charged with 135.6 g (0.4 mole) of 115% polyphosphoric acid. This is heated and ALFOL 20° (595.8 g; 1.2 moles) is added gradually such that the temperature is maintained at 75° C $\pm$ 5° C, preferably at 70°–75° C. The alcohol was added over about a period of 35 minutes. The reaction was exothermic but controllable by very slow addition rate. Upon completion of the $C_{20}$ alcohol addition, the reaction is stirred and heated 15 minutes at 70°–75° C, affording a brown viscous product. To this material at 70° C is slowly added 38.4 g (0.34 mole) of 30% hydrogen peroxide. The temperature being maintained at 70° C by slow, dropwise addition. This addition is completed in about 15 minutes and followed by a 15 minutes post reaction period. An additional 49 g of water is added prior to cooling. The final product, upon cooling, is a waxy tan-yellow solid which melts at about 60° C and weighed about 812 g.

Part B

Preparation of Making Phosphate Ester - Nonionic Surfactant Combination (Additive I)

Six parts by weight of the above $C_{20+}$ phosphate ester and 94 parts of a low-foaming surfactant of the composition ALFOL 610 alcohol . 3PO - 12EO - 18PO as prepared according to methods taught by U.S. Pat. No. 3,956,401 were mixed with heating to 60°–70° C.

This composition was tested for stability and homogeneity by placing the product in a capped bottle and subjecting it to 6 freeze-thaw cycles of 1 hour duration each cycle. Upon completion of this test, the additive remained completely homogeneous with no separation. It was allowed to stand at ambient temperature for 42 days at the conclusion of the freeze-thaw test and no separation was noted at the end of the time.

The additive was also incorporated in an automatic dishwashing formulation as follows:

| Formulation I | Weight Percent |
| --- | --- |
| Additive I | 3 |
| Sodium Tripolyphosphate | 44 |
| Sodium Metasilicate | 15 |
| Sodium Carbonate | 20.5 |
| Sodium Sulfate | 14 |
| Potassium Dichloroisocyanurate | 1.5 |
| Water | 2 |
| | 100.0 |

The above formulation, with and without Additive I, was evaluated in a Hobart Kitchen and automatic dishwasher employing the method of evaluation described above.

Results of dishwasher evaluation:

| | rpm 4th minute |
| --- | --- |
| Without Additive I | 58 |
| With Nonionic Surfactant I But Without Phosphate Ester I | 63 |
| With Additive I | 79 |

EXAMPLE 2

Part A

Preparation of Phosphate Ester with Phosphorous Pentoxide

A phosphate ester was prepared from ALFOL 20+ alcohol and phosphorous pentoxide as follows:

In a 500 ml, 3-necked round-bottom flask which is equipped with a stirrer, thermometer and nitrogen purge was placed 44.9 g (0.1 mole) of ALFOL 20° alcohol. The alcohol was then heated to 50°–60° C until molten with a water bath around the flask to control temperature. Phosphorous pentoxide (7.1 g; 0.05 mole) was then added and the reaction mixture stirred for about 2 hours. At the end of this time, 4 g (0.035 mole) of 30% hydrogen peroxide and 4 g water was added and the mixture stirred for an additional hour. The product was removed from the flask and upon cooling was a waxy tan-yellow solid weighing about 60 g.

Part B

Preparation of Phosphate Ester-Nonionic Surfactant Combination (Additive II)

Six parts of the $C_{20+}$ phosphate ester and 94 parts of a low-foaming surfactant of the composition ALFOL 610 alcohol . 3PO -12EO -15PO were mixed with heating to 60°–70° C.

Additive II was tested for stability and homogeneity as described in Example 1. Upon completion of the test, Additive II remained completely homogeneous with no separation.

Incorporation of 3% Additive II in the automatic dishwashing formulation described in Example 1 and rotor speed evaluation resulted in the following:

|  | rpm 4th minute |
|---|---|
| Without Additive II | 58 |
| With Nonionic Surfactant II only | 64 |
| With Additive II | 79 |

EXAMPLES 3-8

Additional examples of this invention are shown in the attached table. These examples show the foam suppression combinations of phosphate ester (I or II) with low-foaming surfactants (I or II) at phosphate ester concentrations from 2 to 10%.

TABLE

| Example | Phosphate Ester Preparation | Low-Foaming Surfactant | Percent Phosphate Ester in Surfactant Composition | rpm 4th Minute |
|---|---|---|---|---|
| 3 | II | I | 5 | 75 |
| 4 | II | I | 10 | 83 |
| 5 | II | II | 9.1 | 80 |
| 6 | I | I | 2 | 70 |
| 7 | I | I | 5 | 78 |
| 8 | I | II | 5 | 76 |

What is claimed is:

1. An additive composition which can be adapted into automatic dishwasher detergents for reducing foam during use thereof, comprising:
   A. a nonionic surface active agent having the formula:

$$RO-(CH_2-CH(R')-O)_x-(CH_2-CH_2-O)_y-(CH_2-CH(R'')-O)_z-H$$

wherein
   R is a substantially linear, alkyl radical having an average from about 6 to about 12 carbon atoms,
   R' is a linear, alkyl radical of 1 to about 4 carbon atoms,
   R'' is a linear, alkyl radical of 1 to about 4 carbon atoms,
   $x$ is an integer of 1 to about 6,
   $y$ is an integer of about 4 to about 20, and
   $z$ is an integer of about 4 to about 25, and
   B. an alkyl phosphate ester having an average of about 16 to about 28 carbon atoms in the alkyl radical, wherein the weight ratio of (A):(B) is from about 1:1 to about 99:1.

2. The additive composition of claim 1 wherein, as applied to said formula, each of the radicals R' and R'' is methyl.

3. The additive composition of claim 1 wherein said alkyl phosphate ester is the product of reaction a mixture of alkyl alcohols with phosphorous pentoxide or polyphosphoric acid.

4. The additive composition of claim 3 wherein, as applied to said formula, the radical R contains an average of 7-10 carbon atoms and each of the radicals R' and R'' is methyl or ethyl.

5. The additive composition of claim 4 wherein, as applied to said formula, $x$ is an integer of 2-4, $y$ is an integer of 5-15 and $z$ is an integer of 6-20.

6. The additive composition of claim 5 wherein said alkyl phosphate ester contains an average of 18-25 carbon atoms in the alkyl chain.

7. The additive composition of claim 6 wherein, as applied to said formula, each of the radicals R' and R'' is methyl.

8. The additive composition of claim 7 wherein 115% polyphosphoric acid is employed in preparing said alkyl phosphate ester.

9. The additive composition of claim 8 wherein said ratio ranges from about 3:1 to about 90:1.

10. The additive composition of claim 9 wherein from about 1 to about 6 moles of said alcohol mixture is employed per mole of polyphosphoric acid in preparing said alkyl phosphate ester.

11. The additive composition of claim 10 wherein, as applied to said formula, $x$ is 3, $y$ is 12 and $z$ is 15 or 18.

12. The additive composition of claim 11 wherein said alkyl phosphate ester contains an average of 19-23 carbon atoms in the alkyl chain.

13. The additive composition of claim 12 wherein said ratio ranges from about 9:1 to about 49:1.

14. In an automatic dishwasher detergent formulation, the improvement which comprises incorporating therein about 0.2 to about 20 weight percent of the additive of claim 1.

15. In an automatic detergent formulation, the improvement which comprises incorporating therein about 0.5 to about 10 weight percent of the additive of claim 7.

16. In an automatic dishwasher detergent formulation, the improvement which comprises incorporating therein about 2 to about 4 weight percent of the additive of claim 13.

* * * * *

UNITED STATES PATENT OFFICE
CERTIFICATE OF CORRECTION

Patent No. 4,070,298      Dated January 24, 1978

Inventor(s) Michael Scardera and Robert N. Scott

It is certified that error appears in the above-identified patent and that said Letters Patent are hereby corrected as shown below:

Column 4, Line 40, after "suitable" insert the word --particle--.

Column 5, Line 5, delete "Kitched" and insert therefor --Kitchen--.

Column 5, Line 8, delete the word "aim" and insert therefor --arm--.

Column 5, Example 1, Line 44, "20°" should read --20+--.

Column 6, Example 2, Line 44, "20°" should read --20+--.

Column 8, Claim 3, Line 7, change the word "reaction" to --reacting--.

Column 8, Claim 15, Line 43, after the word "automatic" insert the word --dishwasher--.

Signed and Sealed this

Twenty-third Day of May 1978

[SEAL]

Attest:

RUTH C. MASON
Attesting Officer

LUTRELLE F. PARKER
Acting Commissioner of Patents and Trademarks